(12) United States Patent
Hockings et al.

(10) Patent No.: US 10,079,928 B2
(45) Date of Patent: Sep. 18, 2018

(54) AUTHENTICATING A SECOND TERMINAL BASED ON INFORMATION SENSED BY A FIRST TERMINAL

(71) Applicant: International Business Machines Corporation, Armonk, NY (US)

(72) Inventors: Christopher J. Hockings, Southport (AU); Philip A. J. Nye, Southport (AU); Tadashi Tsumura, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/804,753

(22) Filed: Jul. 21, 2015

(65) Prior Publication Data

US 2016/0036955 A1 Feb. 4, 2016

(30) Foreign Application Priority Data

Jul. 30, 2014 (JP) ................. 2014-154657

(51) Int. Cl.

| | | |
|---|---|---|
| H04M 1/66 | (2006.01) | |
| H04M 1/725 | (2006.01) | |
| H04W 12/06 | (2009.01) | |
| H04M 1/67 | (2006.01) | |
| H04L 29/06 | (2006.01) | |
| H04B 7/00 | (2006.01) | |
| H04W 88/02 | (2009.01) | |

(52) U.S. Cl.
CPC ...... H04M 1/72519 (2013.01); H04L 63/083 (2013.01); H04L 63/0853 (2013.01); H04L 63/0861 (2013.01); H04M 1/67 (2013.01); *H04W 12/06* (2013.01); *H04M 2250/12* (2013.01); *H04W 88/02* (2013.01)

(58) Field of Classification Search
CPC ........ H04W 12/06; H04W 88/02; H04B 5/00; H04M 1/7253; H04M 2250/02; H04M 1/72519; H04M 1/67; H04M 2250/12; H04L 63/083; H04L 63/0853; H04L 63/0861
USPC ....................................... 455/411
See application file for complete search history.

(56) References Cited

U.S. PATENT DOCUMENTS

| | | | | |
|---|---|---|---|---|
| 9,185,100 | B1* | 11/2015 | Juels | H04W 4/023 |
| 2014/0113591 | A1* | 4/2014 | Takai | H04W 12/06 |
| | | | | 455/411 |
| 2014/0206288 | A1* | 7/2014 | Liu | H04W 12/04 |
| | | | | 455/41.2 |

(Continued)

FOREIGN PATENT DOCUMENTS

| | | |
|---|---|---|
| JP | 2008-282084 A | 11/2008 |
| JP | 2009-245122 A | 10/2009 |

(Continued)

*Primary Examiner* — Huy C Ho
(74) *Attorney, Agent, or Firm* — Francis Lammes; Stephen J. Walder, Jr.; Jeffrey S. LaBaw

(57) ABSTRACT

A mechanism is provided for authenticating a second terminal based on information sensed by a first terminal. Responsive to receiving an authentication request, a first output request is sent to a second terminal instructing the second terminal to generate information able to be sensed by a sensor in a first terminal. An authentication of the authentication request is performed based on a condition that the sensor in the first terminal has sensed the information generated by the second terminal.

15 Claims, 8 Drawing Sheets

(56) References Cited

U.S. PATENT DOCUMENTS

2015/0310444 A1* 10/2015 Chen .................. G06Q 20/4016
705/44

FOREIGN PATENT DOCUMENTS

| JP | 2010-187282 A | 8/2010 |
| JP | 2013-003746 A | 1/2013 |
| JP | 2014-86790 A | 5/2014 |
| WO | WO03053007 A1 | 6/2003 |
| WO | WO2008075638 A1 | 6/2008 |
| WO | WO2012091164 A1 | 7/2012 |

* cited by examiner

FIG. 6

| User ID | Terminal ID |
|---|---|
| XF-YGR-1 | AXbc-3 |
| | FHka-2 |
| AF-STS-2 | YYbb-1 |
| | WAyt-5 |
| BD-YRS-5 | VCbc-8 |
| | WPas-4 |

User/Terminal Database

US 10,079,928 B2

AUTHENTICATING A SECOND TERMINAL BASED ON INFORMATION SENSED BY A FIRST TERMINAL

BACKGROUND

The present invention relates to an authentication device, program, and method for authenticating a second terminal based on information sensed by a first terminal.

Devices used to authenticate terminals such as smartphones are known in the art as disclosed in Patent Publication No. 2008-282084. A technology is described in Patent Literature 1 in which, when a device is held in the hand of the user, vibrations are applied to a finger in contact with the device, the vibrations transmitted to another finger are received, and the received vibrations are used to determine whether or not the user has permission to use the device.

SUMMARY

Techniques used to perform the authentication process between terminals are known in the art, but the user has to enter a password into each terminal to authenticate the terminals, and this authentication process imposes a burden on the user.

In one illustrative embodiment, a method, in a data processing system, is provided for authenticating a second terminal based on information sensed by a first terminal. The illustrative embodiment receives an authentication request. The illustrative embodiment sends a first output request to the second terminal instructing the second terminal to generate information able to be sensed by a sensor in the first terminal. The illustrative embodiment authenticates the authentication request based on a condition that the sensor in the first terminal has sensed the information generated by the second terminal.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus/device is provided. The system/apparatus/device may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

This summary of the present invention is not intended to enumerate all of the required characteristics of the present invention. The present invention may be realized by any combination or sub-combination of these characteristics.

BRIEF DESCRIPTION OF THE DRAWINGS

FIG. 6 is an example of a user/terminal database.

DETAILED DESCRIPTION

The following is an explanation of the present invention with reference to embodiments of the present invention. However, the present embodiments do not limit the present invention in the scope of the claims. Also, all combinations of characteristics explained in the embodiments are not necessarily required in the technical solution of the present invention.

Figure 1:
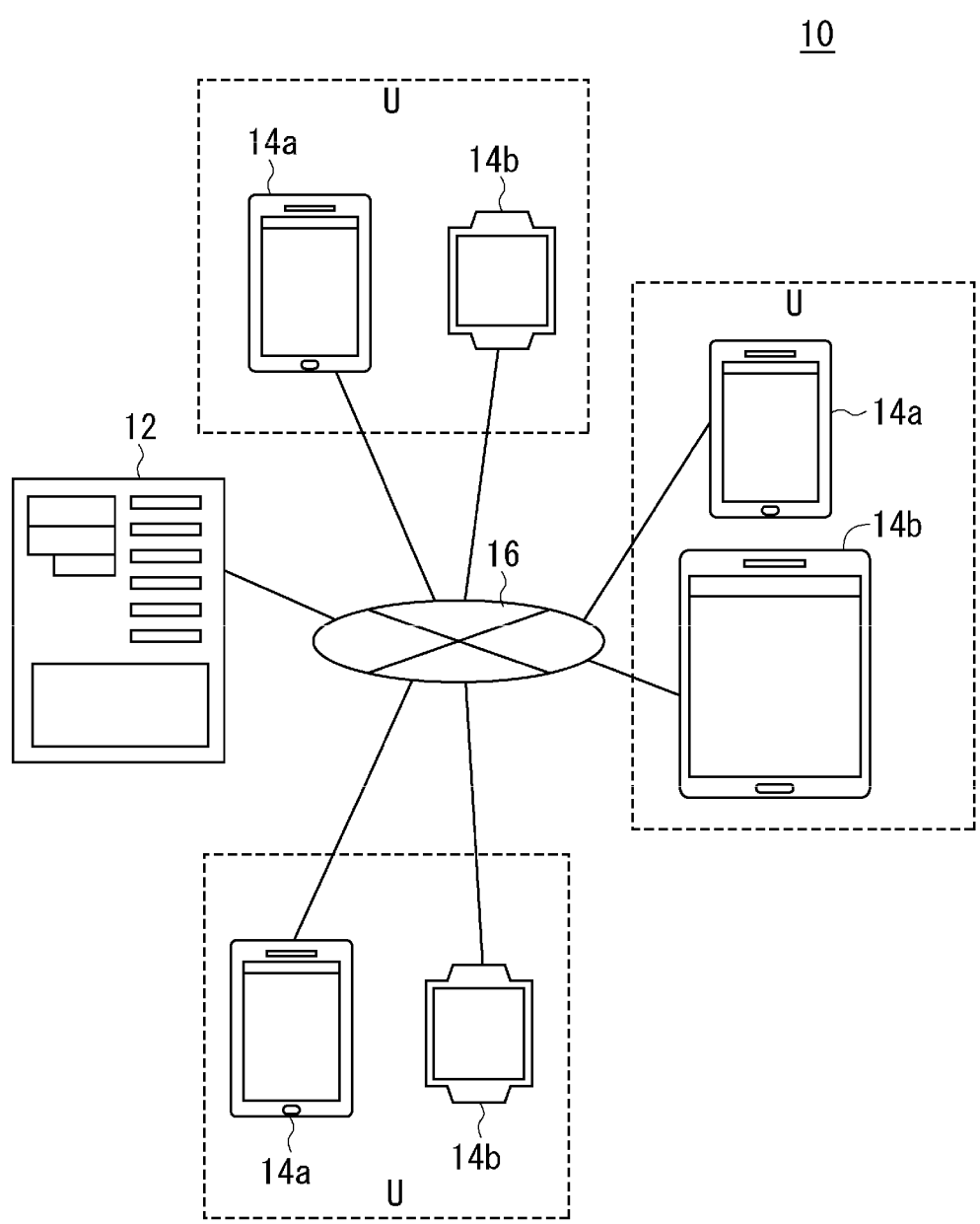
FIG. 1 is a diagram of the overall structure of an information system 10.

FIG. 1 is a diagram of the overall structure of information system 10. As shown in FIG. 1, the information system 10 includes one or more authentication devices 12 and one or more terminals 14. The authentication devices 12 and the terminals 14 are connected via a network 16 so as to be able to send and receive information such as passwords.

In the information processing system 10, the authentication device 12 generates information such as vibrations that can be sensed by a vibration sensor for terminals 14, and a plurality of terminals 14 can be successfully authenticated on condition that each terminal 14 senses the vibrations. In this way, the authentication device 12 is able to easily authenticate a plurality of terminals 114 without the user having to enter a password.

An example of an authentication device 12 is one or more computers at a financial institution functioning as a web server for providing interact banking services. Another example of an authentication device 12 is one or more computers functioning as a web server providing user authentication services at an IT services company. One of these authentication devices 12 sends a password to a terminal 14 in a group of two or more terminals 14 belonging to a user, and the password PW is entered using the other terminal 14 in order to provide two-factor authentication for authenticating the user U or terminal 14.

The terminal 14 can be a computer such as a smartphone, a watch with communication functions, a car navigation system, or a tablet. Each terminal 14 belongs to a user U. Here, a single user owns a plurality of terminals 14. One terminal 14*a* is held by or attached to the user, and the other terminal 14*b* is held by or attached to the user. When the terminals do not have to be differentiated, the terminals are denoted simply by the reference symbol "14". Terminals denoted by the reference symbols "14*a*" and "14*b*" belong to a user U.

Figure 2:
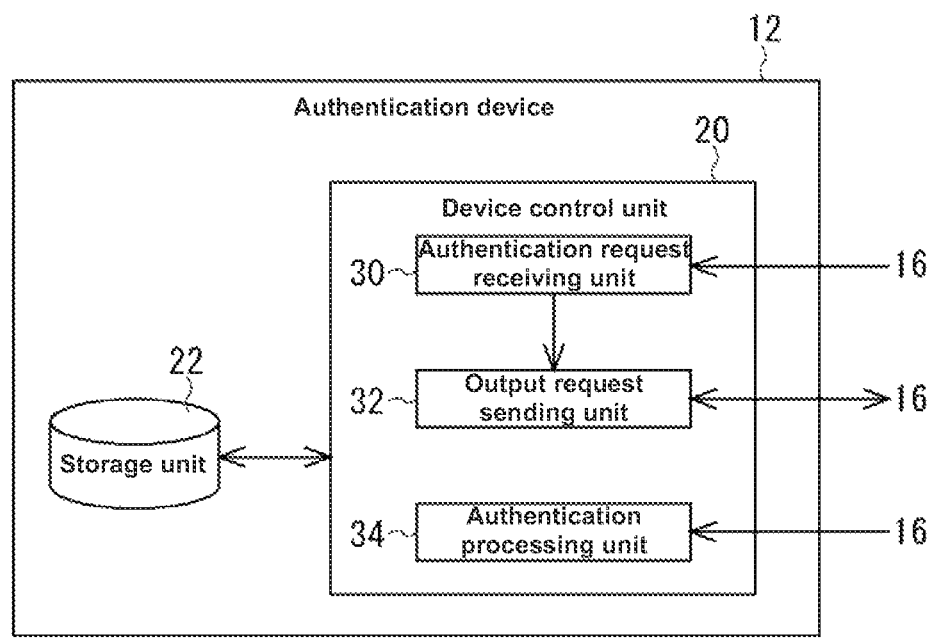
FIG. 2 is a diagram of the overall structure of an authentication device 12.

FIG. 2 is a diagram of the overall structure of an authentication device 12. As shown in FIG. 2, the authentication device 12 has a device control unit 20 and a storage unit 22.

The device control unit 20 includes a processing device such as a central processing unit (CPU). The device control unit 20 includes an authentication request receiving unit 30, an output request sending unit 32, and an authentication processing unit 34. The device control unit 20 reads a program stored in the storage unit 22 to function as the authentication request receiving unit 30, the output request sending unit 32, and the authentication processing unit 34.

The authentication request receiving unit 30, the output request sending unit 32, and the authentication processing unit 34 can be configured wholly or in part using hardware such as circuitry.

The authentication request receiving unit 30 receives an authentication request from a terminal 14 belonging to the user U via the network 16. The authentication request receiving unit 30 outputs a notification to the output request sending unit 32 indicating that an authentication request has been received.

The output request sending unit 32 sends to another terminal 14 an output request instructing the other terminal 14 to generate information that can be sensed by a sensor in the one terminal 14 via the network 16. For example, the output request sending unit 32 instructs the user via terminal 14a and/or terminal 14b to perform an operation generating a motion such as vibrations in the other terminal 14. In another example, the output request sending unit 32 instructs the user via the one terminal 14 and/or the other terminal 14 to perform a gesture on the other terminal 14 such as tapping the terminal.

The authentication processing unit 34 successfully authenticates both terminals 14 on condition that the information generated by the other terminal 14 is sensed by a sensor in the one terminal 14 via the network 16. For example, the authentication processing unit 34 performs successful authentication on condition that motion such as vibrations generated by the other terminal 14 are sensed by a sensor in the one terminal 14. The authentication processing unit 34 may also perform successful authentication on condition that motion in the one terminal 14 caused by motion generated by the other terminal 14 is sensed by a sensor in the one terminal 14. The authentication processing unit 34 may also perform successful authentication on condition that motion in the one terminal 14 caused by a gesture performed on the other terminal 14 is sensed by a sensor in the one terminal 14. The authentication processing unit 34 determines whether or not authentication has been successful on the basis of the results of comparing information sensed by a sensor in the one terminal 14 to information sensed by a sensor in the other terminal 14.

The storage unit 22 stores programs executed by the device control unit 20, as well as parameters needed to execute the programs.

Figure 3:
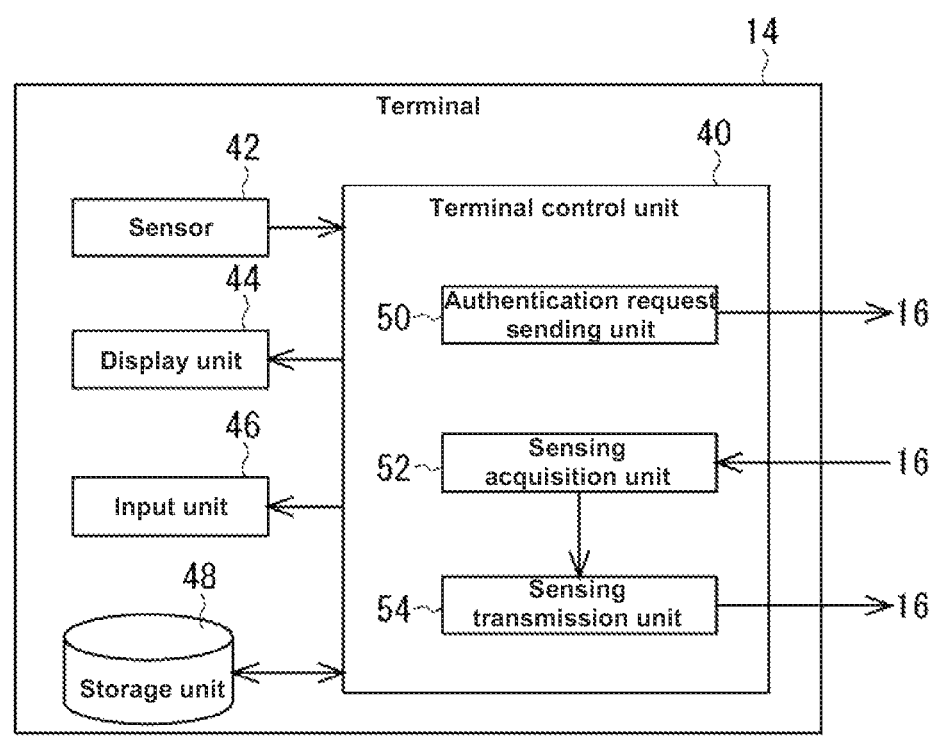
FIG. 3 is a diagram of a terminal 14.

FIG. 3 is a configuration example of a terminal 14. As shown in FIG. 3, the terminal 14 has a terminal control unit 40, a sensor 42, a display unit 44, an input unit 46, and a storage unit 48.

The terminal control unit 40 includes a processing device such as a CPU. The terminal control unit 40 has an authentication request sending unit 50, a sensing acquisition unit 52, and a sensing transmission unit 54. The terminal control unit 40 reads a program stored in the storage unit 48 to function as the authentication request sending unit 50, sensing acquisition unit 52, and sensing transmission unit 54. Some or all of the authentication request sending unit 50, sensing acquisition unit 52, and sensing transmission unit 54 can be configured from hardware such as circuitry.

The authentication request sending unit 50 sends an authentication request requesting authentication of a terminal 14 or a user to the authentication device 12 via the network 16. For example, the authentication request sending unit 50 may send an authentication request along with a terminal ID indicating the terminal 14 and a user ID indicating the user U.

The sensing acquisition unit 52 acquires sensor output which is information sensed by a sensor 42. For example, the sensing acquisition unit 52 of one terminal 14 displays on the display unit 44 a screen in response to an output request received from the authentication device 12 via the network 16. In response to the screen displayed on the display unit 44, the user manipulates another terminal 14, and information such as vibrations caused by this manipulation are sensed by the sensor 42. The sensing acquisition unit 52 acquires sensor output from the sensor 42. The sensing acquisition unit 52 then outputs the acquired sensor output to the sensing transmission unit 54.

The sensing transmission unit 54 sends the sensor output acquired by the sensing acquisition unit 52 to the authentication device 12 via the network 16. For example, sensor output including information such as vibrations is sent by the sensing transmission unit 54 to the authentication device 12.

The sensor 42 detects information generated by the terminal 14 that can be sensed. An example of a sensor 42 is a vibration sensor. The sensor 42 senses the vibrations generated in the terminal 14 and outputs the vibrations to the sensing acquisition unit 52.

An example of a display unit 44 is a liquid crystal display or organic EL display. The display unit 44 displays an image on the basis of image information inputted from the terminal control unit 40. For example, the display unit 44 displays an image based on the output request acquired from the sensing acquisition unit 52.

The input unit 46 receives input from the user. For example, the input unit 46 receives input from the user in response from the output request. An example of an input unit 46 is a touch panel.

The storage unit 48 stores the program executed by the terminal control unit 40 and parameters needed to execute the program.

Figure 4:
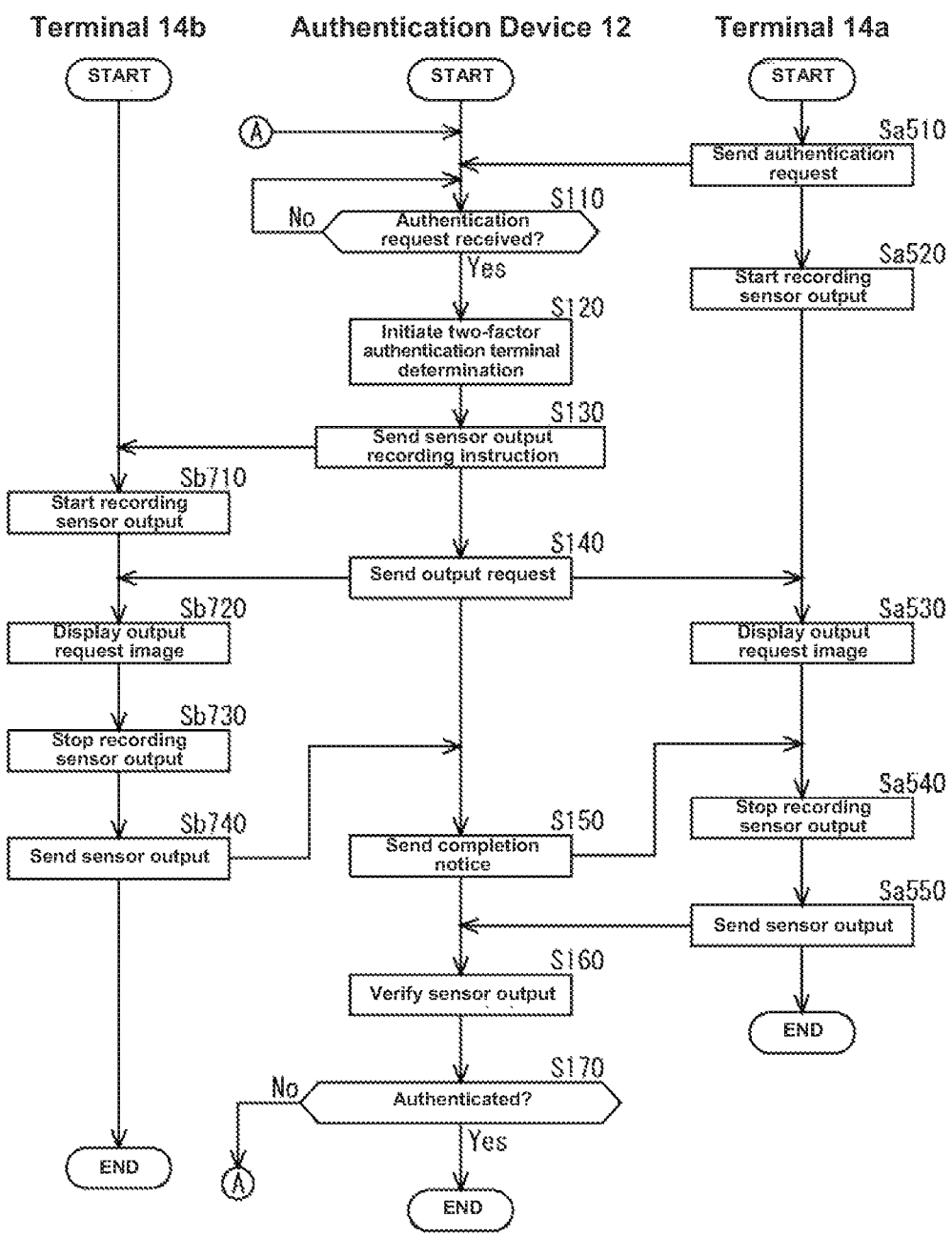
FIG. 4 is a flowchart of the authentication process performed by the authentication device 12.
Figure 5:
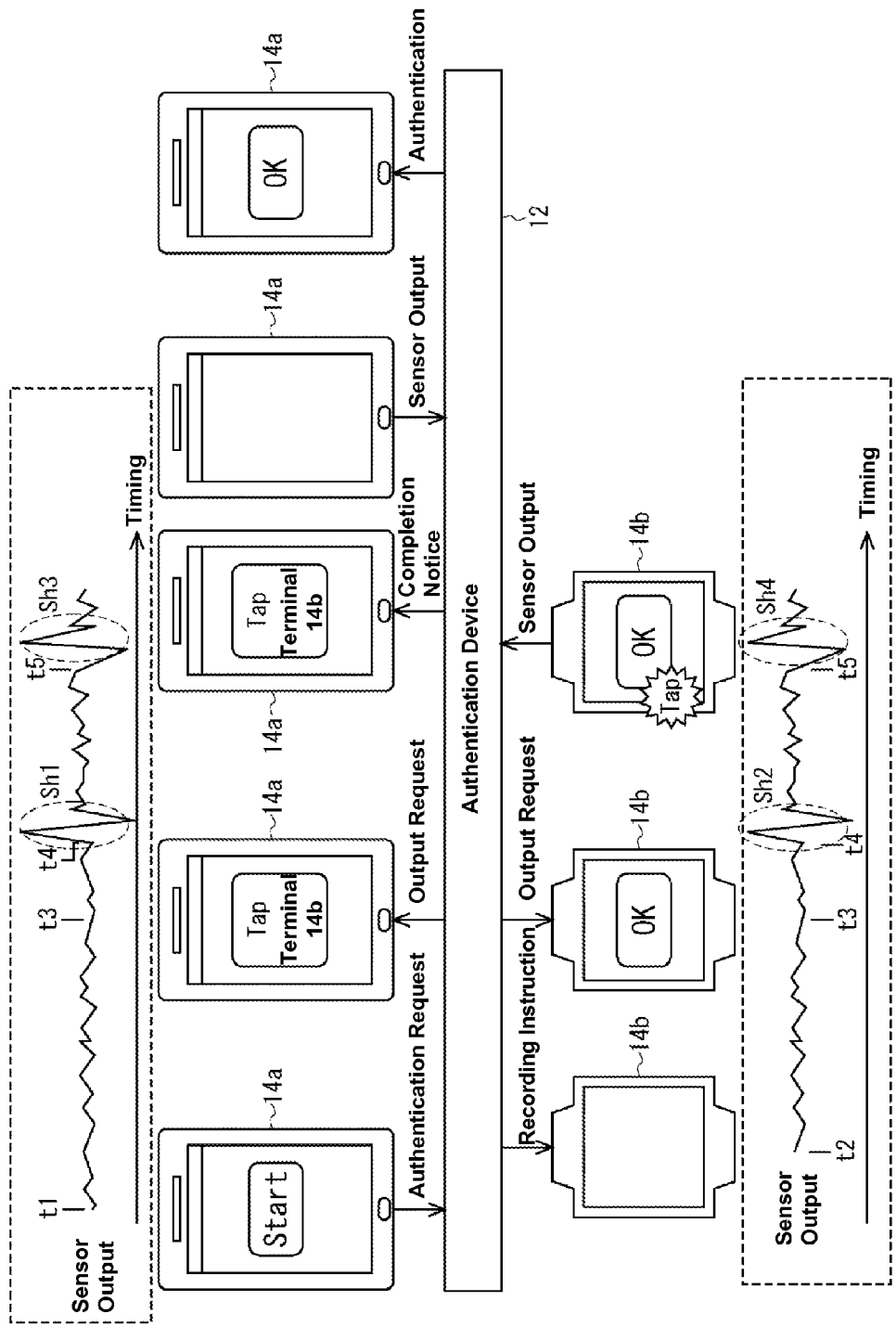
FIG. 5 is a diagram in which the statuses of the devices during the authentication process are arranged on a time line.

FIG. 4 is a flowchart of the authentication process performed by the authentication device 12. FIG. 5 is a diagram in which the statuses of the devices during the authentication process are arranged on a time line. FIG. 6 is an example of a user/terminal database. The user holds a terminal 14a in the palm of the left hand and manipulates the terminal 14a while viewing the screen. The user is also wearing a terminal 14b on the wrist of the left hand, and the flowchart shown in FIG. 4 is initiated. Terminal 14a is a smartphone, and terminal 14b is a wristwatch with a communication function.

When the authentication process shown in FIG. 4 has been initiated, the authentication request receiving unit 30 in the authentication device 12 remains in standby mode until an authentication request has been received from a terminal (S110: No). As shown in FIG. 5, the authentication request sending unit 50 in the terminal 14a responds to an instruction from the user by sending an authentication request along with the terminal ID and user ID on timing t1 (Sa510). When the authentication request receiving unit 30 receives the authentication request (S110: Yes), notification of reception is outputted to the output request sending unit 32. When the terminal 14a has received the instruction from the authentication request sending unit 50, notification is outputted to the sensing acquisition unit 52, and the sensing acquisition unit 52 starts to acquire and record sensor output from the sensor 42 (Sa520). For example, the sensing acquisition unit 52 receives electrical signals corresponding to vibrations acquired by the sensor 42 as sensor output, associates the sensor output with the timing, and records the associated information in the storage unit 48.

The output request sending unit 32 determines the other terminal 14b in the two-factor terminal authentication (S120). For example, the output request sending unit 32, as shown in FIG. 6, searches the acquired user in the user/terminal database stored beforehand in the storage unit 22. In the user/terminal database, user IDs are associated with terminal IDs. The output request sending unit 32 determines that the other terminals 14b is the terminal ID with the terminal ID other than the terminal ID received with the authentication request among the terminal IDs associated with the searched user ID. In the example shown in FIG. 6, two terminal IDs are associated with each user ID. However, three or more terminal IDs may be associated with each user ID.

The output request sending unit 32 sends recording instructions to the other terminal 14b to record sensor output (S130).

When the sensing acquisition unit 52 in the terminal 14b acquires the recording instruction at timing t2, it starts to acquire sensor output from the sensor 42 and to record the sensor output in the storage unit 48 (Sb710).

The output request sending unit 32 sends an output request to terminal 14a and terminal 14b (S140). The output request sending unit 32 may combine the output request with the recording instructions for recording sensor output and send the combination to terminal 14b.

When the sensing acquisition unit 52 in terminal 14a and terminal 14b receives the output request at timing t3, the output request image is displayed on the display unit 44 (Sa530, Sb720). For example, as shown in FIG. 5, the sensing acquisition unit 52 in terminal 14a displays "Tap terminal 14b" on the display unit 44. Also, as shown in FIG. 5, the sensing acquisition unit 52 in terminal 14b displays "OK" in the area of the display unit 44 receiving atop from the user.

At this stage, the user operates terminal 14a while looking at the terminal. Therefore, when the user sees "Tap terminal 14b" on the display unit 44, the user shifts to tapping terminal 14b. The user turns the wrist of the right hand at timing t4 to view the display unit 44 on the terminal 14b. As a result, the sensor 42 in terminal 14a and the sensor 42 in terminal 14b detect, at constant intervals, vibrations Sh1, Sh2 generated by the user turning the left wrist in the same time period beginning at timing t4.

Next, the user taps the display unit 44 of terminal 14b at timing t5 accordance with the image displayed on terminal 14a. As a result, the sensor 42 in terminal 14a, and the sensor 42 in terminal 14b detect, at constant intervals, vibrations Sh3, Sh4 in the same time period beginning at timing t5.

In response to the user tapping the screen, the sensing acquisition unit 52 in terminal 14b stops recording sensor output (Sb730), and notifies the sensing transmission unit 54. The sensing acquisition unit 52 may also stop recording sensor output when vibrations Sh3, Sh4 have not been detected in accordance with the image displayed on terminal 14a within a predetermined amount of time. When a notification to stop has been received by the sensing transmission unit 54, the recorded sensor output is sent, along with the timing information, to the authentication device 12 (Sb740).

When the authentication processing unit 34 in the authentication device 12 has received the sensor output from the terminal 14b, notification of the completion of sensor output recording in terminal 14b is sent to terminal 14a (S150).

When the sensing acquisition unit 52 in terminal 14a receives notification of the completion of recording from the authentication device 12, sensing acquisition unit 52 stops recording sensor output (Sa540), and outputs the notification of stopping to the sensing transmission unit 54. The sensing acquisition unit 52 may also stop recording sensor output if a notification of stopping has not been received in a predetermined amount of time. When the sensing transmission unit 54 receives the notification of stopping, it sends the recorded sensor output to the authentication device 12 (Sa550).

When the authentication processing unit 34 in the authentication device 12 has received the sensor output from the terminal 14a, it compares and verifies the sensor output received earlier from terminal 14b with the sensor output received from terminal 14a (S160). More specifically, the authentication processing unit 34 verifies the sensor output from terminal 14a and terminal 14b using statistical analysis such as a time series analytical technique.

As a result of verifying the sensor output from both terminals, the authentication processing unit 34 determines whether or not to authenticate both terminal 14a and terminal 14b (S170). For example, the authentication processing unit 34 determines whether or not the vibrations generated by terminal 14b are included in the sensor output from terminal 14a.

As mentioned above, when the user is holding or wearing terminal 14a and terminal 14b in the left hand, the large vibrations are recorded on the same timing in the sensor output of terminal 14a and terminal 14b as shown in FIG. 5. As a result, the authentication device 12 determines that terminal 14a and terminal 14b are close to each other, successfully authenticates both terminals (S170: Yes), and ends the authentication process.

When the user is only holding terminal 14a and terminal 14b is at another location because of theft or some other factor, large vibrations are recorded on different timings even when the output request is sent to both terminal 14a and terminal 14b. As a result, the authentication device 12 determines that terminal 14a and terminal 14b are not close to each other, does not authenticate the terminals (S170: No), and repeats the authentication process beginning with Step S110.

When terminal 14a is being held by the user in the right hand and terminal 14b is being worn on the left wrist, it is highly unlikely that the large vibrations Sh1 generated at timing t4 will be picked up by the sensor 42. However, even here, the vibrations Sh3, Sh4 at timing t5 will be picked up by the sensor 42. Therefore, the authentication processing unit 34 may verify sensor output using any one of these vibrations to successfully authenticate terminals 14a and 14b.

As mentioned above, the authentication device 12 performs successful authentication on condition that an output request sent by the output request sending unit 32 has been received by one terminal 14, the user operates another terminal 14 according to the output request, and the one terminal 14 has sensed vibrations generated as information by the other terminal 14. In this way, the authentication device 12 does not authenticate two terminals 14a, 14b that are at some distance from one another due to theft or some other factor, but two terminals 14a, 14b near each other can be successfully authenticated. Also, because the authentication device 12 can perform the authentication process without the user having to perform an operation such as entering a password, the burden on the user can be reduced and problems associated with the leaking of passwords can be reduced.

The connecting relationships between the elements in the configurations of each embodiment can be changed if necessary. Also, the embodiments described above may be combined if desired.

Figure 7:
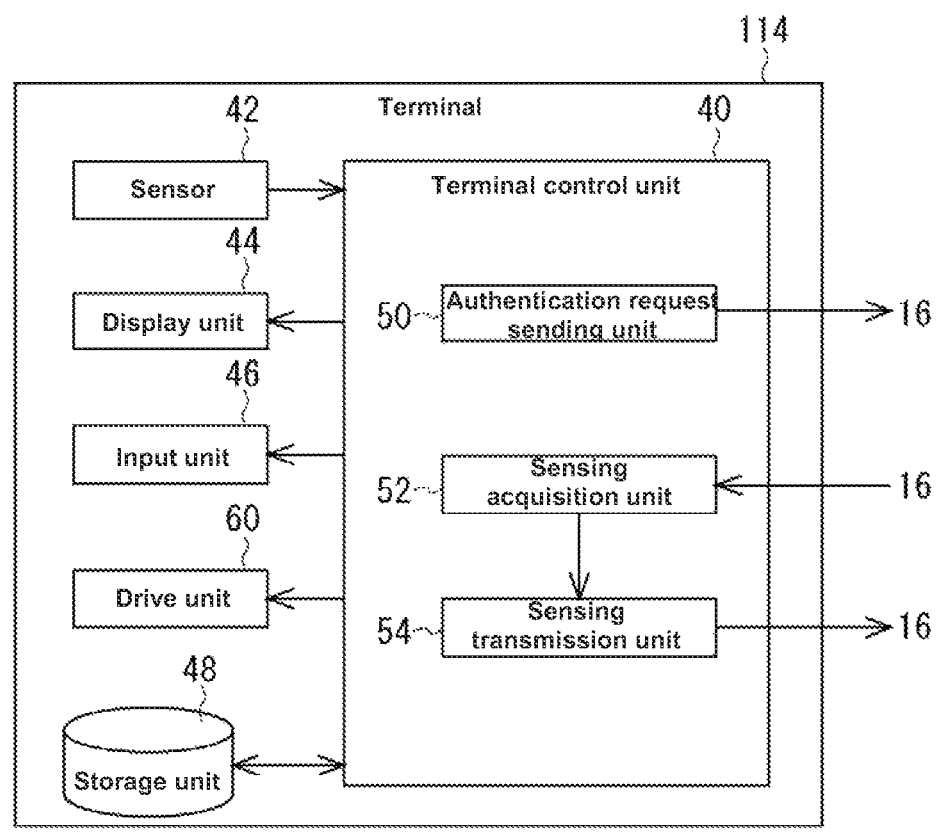
FIG. 7 is a configuration example of another terminal 114.

FIG. 7 is a diagram of the terminals 114 similar to that shown in FIG. 3 in another embodiment. As shown in FIG. 7, one terminal 114 has a drive unit 60 that is able to generate vibrations. In this case, the output request sending unit 32 sends an output request to the drive unit 60 of the one terminal 114 to generate vibrations. The authentication processing unit 34 successfully performs the authentication process on condition that the vibrations generated by the one terminal 114 are sensed by a sensor 42 in another terminal 114.

In an embodiment described above, the output request sending unit 32 sends an output request to the terminal 14a sending the authentication request. However, the present invention is not limited to this embodiment. For example, the output request sending unit 32 may send an output request to a terminal 14b other than the terminal 4a sending the authentication request. The output request may cause the one terminal 14a to perform an operation such as generating vibrations, or may cause the other terminal 14b to perform an operation such as generating vibrations.

In an embodiment described above, the output request sending unit 32 only sends an output request to one terminal 14a. However, the present invention is not limited to this embodiment. For example, the output request sending unit 32 may send a first output request to the one terminal 14a instructing it to cause the other terminal 14b to generate information such as vibrations that can be sensed by a sensor 42 in the one terminal 14a. Along with the first output request, the output request sending unit 32 may also send to the other terminal 14b a second output request instructing it to cause the first terminal 14a to generate information such as vibrations that can be sensed by a sensor 42 in the other terminal 14b. In this case, the authentication processing unit 34 successfully performs the authentication process on condition that the information generated by terminal 14b has been sensed by a sensor 42 in terminal 14a, and on condition that the information generated by terminal 14a has been sensed by a sensor 42 in terminal 14b. In other words, the authentication processing unit 34 causes both terminals 14 to generate information such as vibrations for each other to successfully authenticate the terminals 14.

In another embodiment, the authentication processing unit 34 may receive from the other terminal 14b timing information indicating the timing of information such as vibrations generated by the other terminal 14b that can be sensed by a sensor 42 in the one terminal 14a. In this embodiment, the authentication processing unit 34 may determine whether or not information generated by the other terminal 14b is included in timing data indicating the timing information in the sensor output of the one terminal 14a. Here, the authentication processing unit 34 can receive timing information only from the other terminal 14b, and reception of sensor output from the other terminal 14b can be omitted.

The output request sending unit 32 may send an output request instructing a plurality of terminals 14 to generate information able to be sensed by a sensor 42. Here, the authentication processing unit 34 may successfully perform the authentication process on condition that the information generated by the terminals 14 has been sensed by a sensor 42 in at least one of the terminals 14. For example, the authentication processing unit 34 may successfully perform the authentication process on condition that the information generated by the terminals 14 has been sensed in a predetermined order. More specifically, the output request sending unit 32 sends an output request for an entered password to a plurality of terminals 14 in a predetermined order. When the user has entered the password into each terminal 14 in sequential order, vibrations corresponding to the input of the password are generated in the predetermined order. The authentication processing unit 34 compares the sensor output corresponding to the vibrations and successfully authenticates the terminals 14 on condition that the vibrations are sensed in the predetermined order.

In an embodiment described above, the information sensed by the sensors 42 is vibrations. However, the sensors 42 may also sense some other kind of information. For example, in addition to motion such as vibrations, the sensors 42 may sense sound, light, electromagnetic waves, atmospheric pressure, and humidity.

The authentication methods in each of the embodiments described above may be combined with an existing authentication method. For example, authentication using vibrations in an embodiment described above may be combined with a password or fingerprint scan to enhance security.

In an embodiment described above, authentication was determined by verifying sensor output from a plurality of terminals 14 once. However, authentication may be determined after verifying sensor output more than once.

In an embodiment described above, the authentication processing unit 34 compared and verified sensor output generated by tapping one of the terminals 14. However, sensor output generated by some other gesture may also be compared. For example, the authentication processing unit 34 may compare and verify sensor output generated by pressing a mechanical button on a terminal 14, rotating a terminal 14, placing a terminal 14 on a table, or shaking a plurality of terminals 14 after entering a password.

Figure 8:
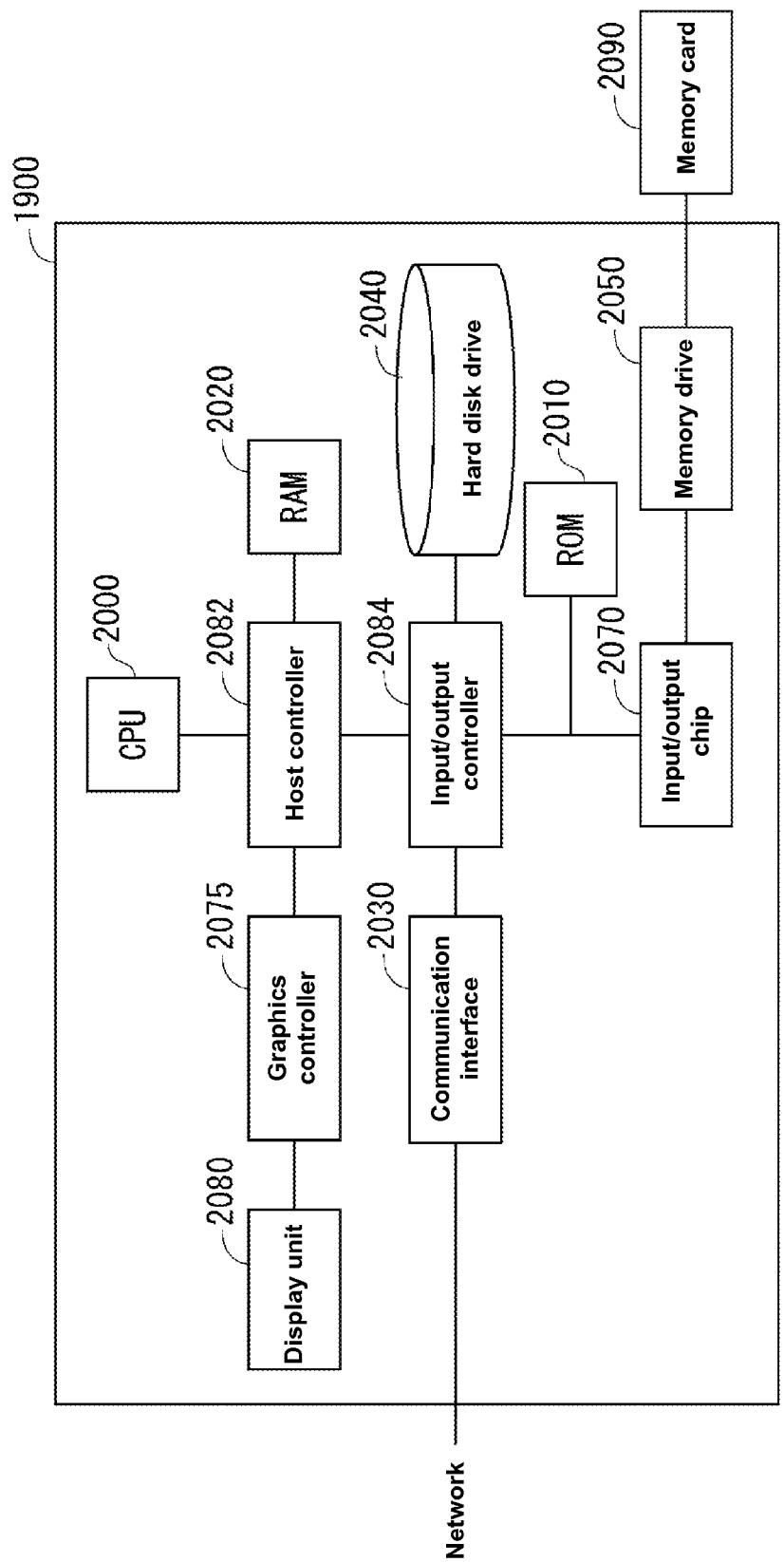
FIG. 8 shows an example of a hardware configuration for a computer 1900 related to the embodiment.

FIG. 8 shows an example of a hardware configuration for a computer 1900 related to the present embodiment. The computer 1900 related to the present embodiment is an example of an authentication device 12 and terminal 14. The computer 1900 in the present embodiment is equipped with a CPU peripheral portion having a CPU 2000, RAM 2020, graphics controller 2075 and display unit 2080 connected to each other by a host controller 2082, an input/output portion having a communication interface 2030, and a hard disk drive 2040 connected to the host controller 2082 by an input/output controller 2084, and a legacy input/output portion having a ROM 2010, memory drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display unit 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, and a hard disk drive 2040. The communication interface 2030 communicates with the other devices via a network. The hard disk drive 2040 stores the programs and data used by the CPU 2000 in the computer 1900.

The input/output controller 2084 is connected to the ROM 2010, the memory drive 2050, and the relatively low-speed input/output device of the input/output chip 2070. The ROM 2010 stores the boot program executed by the computer 1900 at startup and/or programs relying on hardware in the computer 1900. The memory drive 2050 reads programs or data from a memory card 2090, and provides the programs and data to the hard disk drive 2040 via the RAM 2020. The input/output chip 2070 connects the memory drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a memory card 2090 or an IC card provided by the user. A program is read from the recording medium, installed in the hard disk drive 2040 inside the computer 1900 via the RAM 2020, and executed by the CPU 2000.

Programs installed in the computer 1900 to enable the computer 1900 to function as an authentication device 12 include an authentication request receiving module, output request sending module, and authentication processing module. Those programs or modules work with the CPU 2000 and other components to cause the computer 1900 to function as the authentication request receiving unit 30, output request sending unit 32, and authentication processing unit 34.

The information processing steps written in these programs are specific means activated by reading the programs to the computer 1900 so that the software cooperates with the various types of hardware resources described above. These specific means function as the authentication request receiving unit 30, output request sending unit 32, and authentication processing unit 34. These specific means realize operations and the processing of information in the computer 1900 of the present embodiment to construct a dedicated authentication device 12 for the intended purpose.

Programs installed in the computer 1900 to enable the computer 1900 to function as a terminal 14 include an authentication request sending module, sensing acquisition module, and sensing transmission module. Those programs or modules work with the CPU 2000 and other components to cause the computer 1900 to function as the authentication request sending unit 50, sensing acquisition unit 52, and sensing transmission unit 54.

The information processing steps written in these programs are specific means activated by reading the programs to the computer 1900 so that the software cooperates with the various types of hardware resources described above. These specific means function as the authentication request sending unit 50, sensing acquisition unit 52, and sensing transmission unit 54. These specific means realize operations and the processing of information in the computer 1900 of the present embodiment to construct a dedicated terminal 14 for the intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, or memory card 2090, or writes reception data received from the network to a reception buffer region of the storage device. In this way, the communication interface 2030 exchanges data with a storage device using the direct memory access (DMA) method. Alternatively, the CPU 2000 may exchange data by retrieving data from the source storage device or communication interface 2030, and writing the data to the destination communication interface 2030 or storage device.

Also, the CPU 2000 writes all of the data or the necessary data to the RAM 2020 via, for example, a DMA transfer, from files or databases stored in an external storage device such as a hard disk drive 2040 or a memory drive 2050 (memory card 2090), and performs various types of processing on the data in the RAM 2020. The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a storage unit, or a storage device. The various types of information in the programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine. The CPU 2000 can also search files in a storage device or information stored in a database.

A program or module described above be stored in a recording medium of an external unit. Instead of a memory card 2090, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using terms such as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

The invention claimed is:

1. An authentication device comprising:
a processor, and
a memory coupled to the processor, wherein the memory comprises instructions which, when executed by the processor, cause the processor to:
receive an authentication request;
send a first output request to both a first terminal device and a second terminal device, wherein the first output request received by the first terminal instructs the first terminal to generate information able to be sensed by a sensor in the second terminal and wherein the first output request received by the second terminal instructs the second terminal to generate information able to be sensed by a sensor in the first terminal, wherein the first output request instructs a user, via the first terminal or the second terminal, to perform a first action generating a motion in the first terminal, wherein the first output request also instructs the user, via the first terminal or the second terminal, to perform a second action generating a motion in the second terminal, and wherein the authentication request is authenticated based on both a first condition that the motion generated by the first terminal has been sensed by the sensor in the second terminal and a condition that the motion generated by the second terminal has been sensed by the sensor in the first terminal; and
authenticate the authentication request based on both a first condition that the sensor in the second terminal has sensed the information generated by the first terminal and a second condition that the sensor in the first terminal has sensed the information generated by the second terminal thereby providing a two-factor authentication process.

2. The authentication device according to claim 1, wherein both the first terminal and the second terminal are held by the user or attached to the user, and wherein the authentication request is authenticated based on both the condition that motion of the second terminal in response to motion generated by the first terminal has been sensed by the sensor in the second terminal and the condition that motion of the first terminal in response to motion generated by the second terminal has been sensed by the sensor in the first terminal.

3. The authentication device according to claim 1, wherein the first output request instructs the user, via the first terminal or the second terminal, to manipulate the first terminal, wherein the first output requests also instructs the user, via the first terminal or the second terminal, to manipulate the second terminal, and wherein the authentication request is authenticated based on both a condition that motion generated by the first terminal in response to manipulating the first terminal has been sensed by the sensor in the second terminal and a condition that motion generated by the second terminal in response to manipulating the second terminal has been sensed by the sensor in the first terminal.

4. The authentication device according to claim 1, wherein the instructions further cause the processor to:
determine whether or not authentication has been successful on the basis of the results of comparing information sensed by the sensor of the first terminal to information sensed by a sensor of the second terminal.

5. The authentication device according to claim 1, wherein the first output request instructs the first terminal to generate vibrations using a drive unit therein and instructs the second terminal to generate vibrations using a drive unit therein, and wherein the authentication request is authenticated based on both a condition that vibration of the first terminal has been sensed by the sensor of the second terminal and a condition that vibration of the second terminal has been sensed by the sensor of the first terminal.

6. The authentication device according to claim 1, wherein the instructions further cause the processor to:
receive sensor output of the second terminal,
determine whether or not information generated by the first terminal is included in the sensor output of the second terminal,
receive sensor output of the first terminal, and
determine whether or not information generated by the second terminal is included in the sensor output of the first terminal.

7. The authentication device according to claim 6, wherein the instructions further cause the processor to:
receive, by the authentication device from the first terminal, timing information indicating the timing of the generation of information by the first terminal that is able to be sensed by the sensor in the second terminal,
determine whether or not information generated by the first terminal is included in timing data indicating timing information in the sensor output of the second terminal,
receive, by the authentication device from the second terminal, timing information indicating the timing of the generation of information by the second terminal that is able to be sensed by the sensor in the first terminal, and
determine whether or not information generated by the second terminal is included in timing data indicating timing information in the sensor output of the first terminal.

8. A computer program product in an authentication device comprising a non-transitory computer readable storage medium having a computer readable program stored therein, wherein the computer readable program, when executed on a computing device, causes the computing device to:
receive an authentication request;
send a first output request to both a first terminal device and a second terminal device, wherein the first output request received by the first terminal instructs the first terminal to generate information able to be sensed by a sensor in the second terminal and wherein the first output request received by the second terminal instructs the second terminal to generate information able to be sensed by a sensor in the first terminal, wherein the first output request instructs a user, via the first terminal or the second terminal, to perform a first action generating a motion in the first terminal, wherein the first output request also instructs the user, via the first terminal or the second terminal, to perform a second action generating a motion in the second terminal, and wherein the authentication request is authenticated based on both a first condition that the motion generated by the first terminal has been sensed by the sensor in the second terminal and a condition that the motion generated by the second terminal has been sensed by the sensor in the first terminal; and
authenticate the authentication request based on both a first condition that the sensor in the second terminal has sensed the information generated by the first terminal and a second condition that the sensor in the first terminal has sensed the information generated by the second terminal thereby providing a two-factor authentication process.

9. A method, in an authentication device, for two-factor authentication comprising the steps of:
receiving, by the authentication device, an authentication request;
sending, by the authentication device, a first output request to both a first terminal device and a second terminal device, wherein the first output request received by the first terminal instructs the first terminal to generate information able to be sensed by a sensor in the second terminal and wherein the first output request received by the second terminal instructs the second terminal to generate information able to be sensed by a sensor in the first terminal, wherein the first output request instructs a user, via the first terminal or the second terminal, to perform a first action generating a motion in the first terminal, wherein the first output request also instructs the user, via the first terminal or the second terminal, to perform a second action generating a motion in the second terminal, and wherein the authentication request is authenticated, by the authentication device, based on both a first condition that the motion generated by the first terminal has been sensed by the sensor in the second terminal and a condition that the motion generated by the second terminal has been sensed by the sensor in the first terminal; and
authenticating, by the authentication device, the authentication request based on both a first condition that the sensor in the second terminal has sensed the information generated by the first terminal and a second condition that the sensor in the first terminal has sensed the information generated by the second terminal thereby providing the two-factor authentication process.

10. The method according to claim 9, wherein both the first terminal and the second terminal are held by the user or attached to the user, and wherein the authentication request is authenticated, by the authentication device, based on both the condition that motion of the second terminal in response to motion generated by the first terminal has been sensed by the sensor in the second terminal and the condition that motion of the first terminal in response to motion generated by the second terminal has been sensed by the sensor in the first terminal.

11. The method according to claim 9, wherein the first output request instructs the user, via the first terminal or the second terminal, to manipulate the first terminal, wherein the first output requests also instructs the user, via the first terminal or the second terminal, to manipulate the second terminal, and wherein the authentication request is authenticated, by the authentication device, based on both a condition that motion generated by the first terminal in response to manipulating the first terminal has been sensed by the sensor in the second terminal and a condition that motion generated by the second terminal in response to manipulating the second terminal has been sensed by the sensor in the first terminal.

12. The method according to claim 9, further comprising:
determining, by the authentication device, whether or not authentication has been successful on the basis of the results of comparing information sensed by the sensor of the first terminal to information sensed by a sensor of the second terminal.

13. The method according to claim 9, wherein the first output request instructs the first terminal to generate vibrations using a drive unit therein and instructs the second terminal to generate vibrations using a drive unit therein, and wherein the authentication request is authenticated, by the authentication device, based on both a condition that vibration of the first terminal has been sensed by the sensor of the second terminal and a condition that vibration of the second terminal has been sensed by the sensor of the first terminal.

14. The method according to claim 9, further comprising:
receiving, by the authentication device, sensor output of the second terminal,
determining, by the authentication device, whether or not information generated by the first terminal is included in the sensor output of the second terminal,
receiving, by the authentication device, sensor output of the first terminal, and
determining, by the authentication device, whether or not information generated by the second terminal is included in the sensor output of the first terminal.

15. The method according to claim 14, further comprising:
receiving, by the authentication device from the first terminal, timing information indicating the timing of the generation of information by the first terminal that is able to be sensed by the sensor in the second terminal,
determining, by the authentication device, whether or not information generated by the first terminal is included in timing data indicating timing information in the sensor output of the second terminal,
receiving, by the authentication device from the second terminal, timing information indicating the timing of the generation of information by the second terminal that is able to be sensed by the sensor in the first terminal, and
determining, by the authentication device, whether or not information generated by the second terminal is included in timing data indicating timing information in the sensor output of the first terminal.

* * * * *